United States Patent [19]
Chiu

[11] Patent Number: 6,102,167
[45] Date of Patent: Aug. 15, 2000

[54] BRAKE DEVICE FOR A STROLLER

[76] Inventor: Ping-Jan Chiu, No. 1146, Chung-Shan Rd., Ta-Chia Chen, Taichung Hsien, Taiwan

[21] Appl. No.: 09/186,969

[22] Filed: Nov. 5, 1998

[51] Int. Cl.[7] .................................................. B62B 9/08
[52] U.S. Cl. ............................. 188/20; 188/2 F; 188/29; 188/74
[58] Field of Search ............................. 188/20, 1.12, 2 F, 188/19, 21, 22, 29, 31, 69, 74, 265; 16/35 R; 280/47.38

[56] References Cited

U.S. PATENT DOCUMENTS

| | | | |
|---|---|---|---|
| 5,174,418 | 12/1992 | Le et al. ................................... | 188/2 F |
| 5,199,534 | 4/1993 | Goff ......................................... | 188/74 |
| 5,355,977 | 10/1994 | Kuschall ................................ | 188/2 F |
| 5,472,066 | 12/1995 | Schillo et al. ........................... | 188/2 F |

*Primary Examiner*—Robert J. Oberleitner
*Assistant Examiner*—Mariano Sy
*Attorney, Agent, or Firm*—Brinks Hofer Gilson & Lione

[57] ABSTRACT

A brake device for braking a stroller, which has an axle and a wheel mounted rotatably thereon, includes a support post secured relative to and extending uprightly from the rear axle, and a mounting frame disposed on the support post and extending beyond the uppermost part of the wheel. The mounting frame includes two lug portions extending in a first direction transverse to the support post and towards the wheel. The lug portions are spaced apart from each other in a second direction transverse to the first direction. A brake shoe includes a pair of arresting portions with two anchoring ends which are mounted pivotally on the lug portions, respectively. The arresting portions extend in the first direction, are spaced apart from each other in the second direction, and form two arresting surfaces therebeneath. A biasing spring has a biasing action along a lengthwise axis, and two ends fixedly secured relative to the support post and to the brake shoe, respectively. The spring is disposed between the arresting portions such that such that when the arresting portions are in a retracted position, the lengthwise axis is at an angle of at least 90 degrees, the angles being measured in a counterclockwise direction from the first direction.

4 Claims, 6 Drawing Sheets

6,102,167

BRAKE DEVICE FOR A STROLLER

BACKGROUND OF THE INVENTION

1. Field of the Invention

The invention relates to a brake device, more particularly to a brake device for a stroller.

2. Description of the Related Art

Referring to FIG. 1, a conventional brake device is mounted on a stroller (illustrated only in part) which a rear axle 11 and wheel members 20 mounted rotatably thereon. The conventional brake device includes an elongated pedal plate 30 that extends in a direction transverse to the rear axle 11 and that has a mounting portion 31 pivotally mounted on the rear axle 11, an actuating portion 33, and an intermediate portion 32 with a pair of inclined surfaces 321 that gradually diverge outward and downward from the intermediate portion 32. Two brake rods 40 are disposed respectively on opposite sides of the pedal plate 30, and are parallel to the rear axle 11. Two brake holders 12 are disposed underneath the rear axle 11 at two sides of the pedal plate 30 in order to retain the brake rods 40 in such a manner that the brake rods 40 are normally biased inwardly with respect to the wheel members 20 so that the brake rods 40 are unable to brake the wheel members 20.

When it is desired to stop the stroller from moving, the actuating portion 33 is pressed downward about the rear axle 11, wherein the inclined surfaces 321 abut and push the brake rods 40 such that distal ends of the brake rods 40 extend between the spokes 21 of the wheel members 20, thereby stopping the movement of the stroller.

A disadvantages of the conventional brake device resides in that, since there is a relatively large clearance between adjacent two of the spokes 21, the wheel members 20 are still movable after the braking action.

SUMMARY OF THE INVENTION

Therefore, the object of this invention is to provide a brake device for a stroller which is adapted to brake a stroller wheel effectively.

Accordingly, the brake device of this invention is used in a stroller for braking a stroller wheel, and includes a support post, a mounting frame, a brake shoe and a biasing spring. The stroller includes a wheel member with a tire, and a rear axle having the wheel member mounted rotatably thereon. The support post is adapted to be disposed inboard to the wheel member, and is adapted to be fixedly secured relative to and is adapted to extend uprightly from the rear axle beyond an uppermost part of the tire. The mounting frame is disposed on the support post and is adapted to be located beyond the uppermost part of the tire. The mounting frame includes two lug portions respectively extending in a first direction transverse to the support post and towards the tire. The lug portions are spaced apart from each other in a second direction transverse to the first direction. The brake shoe includes a pair of arresting portions with two anchoring ends which are mounted pivotally on the lug portions, respectively. The arresting portions extend in the first direction, are spaced apart from each other in the second direction, and form two arresting surfaces therebeneath that are adapted to arrest two spaced locations on the uppermost part of the tire. The arresting portions are pivotable around a pivot axis which is parallel to the second direction between a retracted position, where the arresting portions are lifted away from the spaced locations on the tire, and an arresting position, where the arresting portions depress the upper part of the tire at the spaced locations. The biasing spring has a biasing action along a lengthwise axis, and two ends fixedly secured relative to the support post and to the brake shoe, respectively. The biasing spring is disposed at a location which is between the arresting portions such that when the arresting portions are in the retracted position, the lengthwise axis is at an angle of at least 90 degrees, and such that when the arresting portions are in the arresting position, the lengthwise axis is at an angle of less than 90 degrees, the angles being measured in counterclockwise direction from the first direction.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENTS

Figure 1:
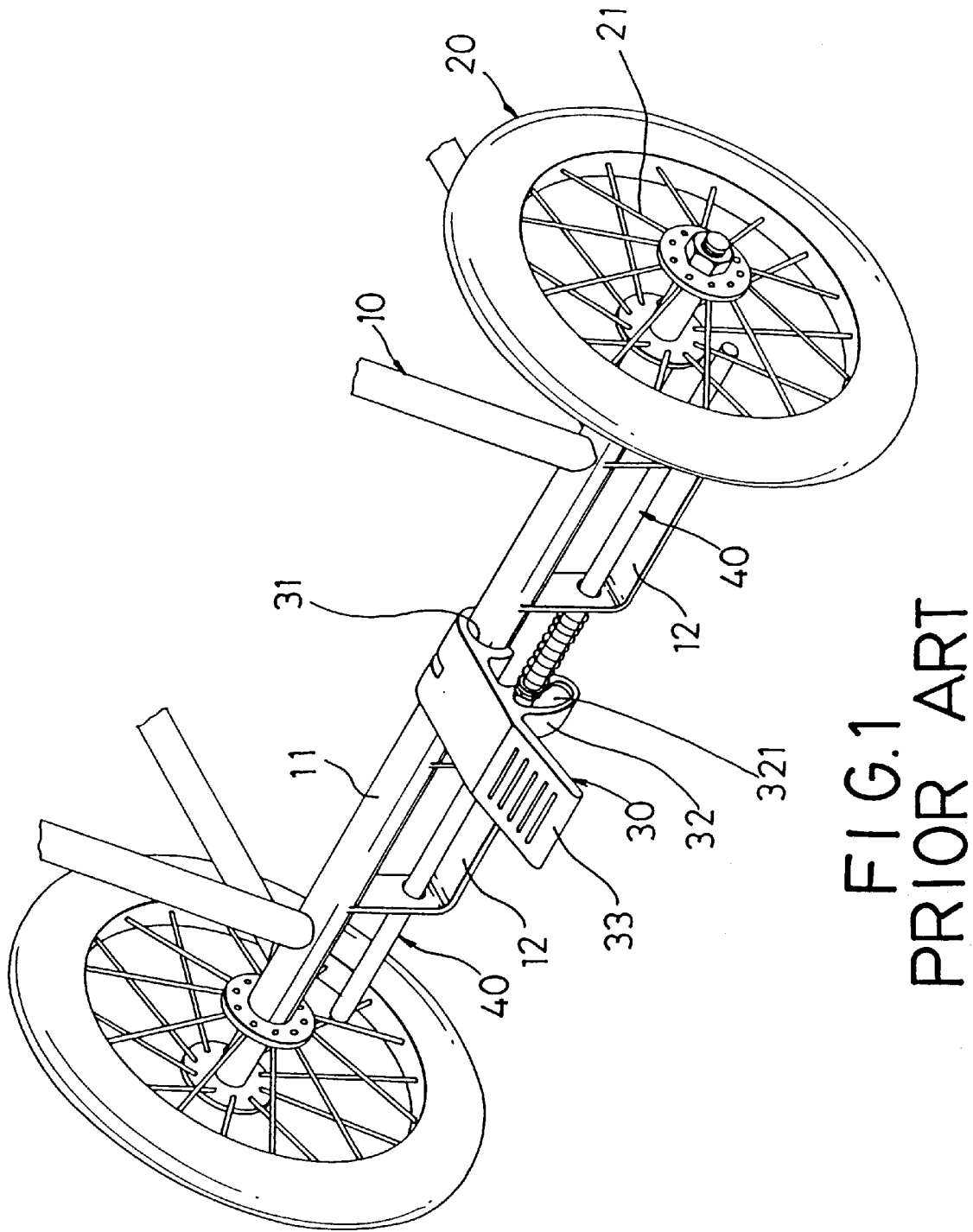
FIG. 1 is a perspective view of a conventional brake device mounted on a stroller.
Figure 2:
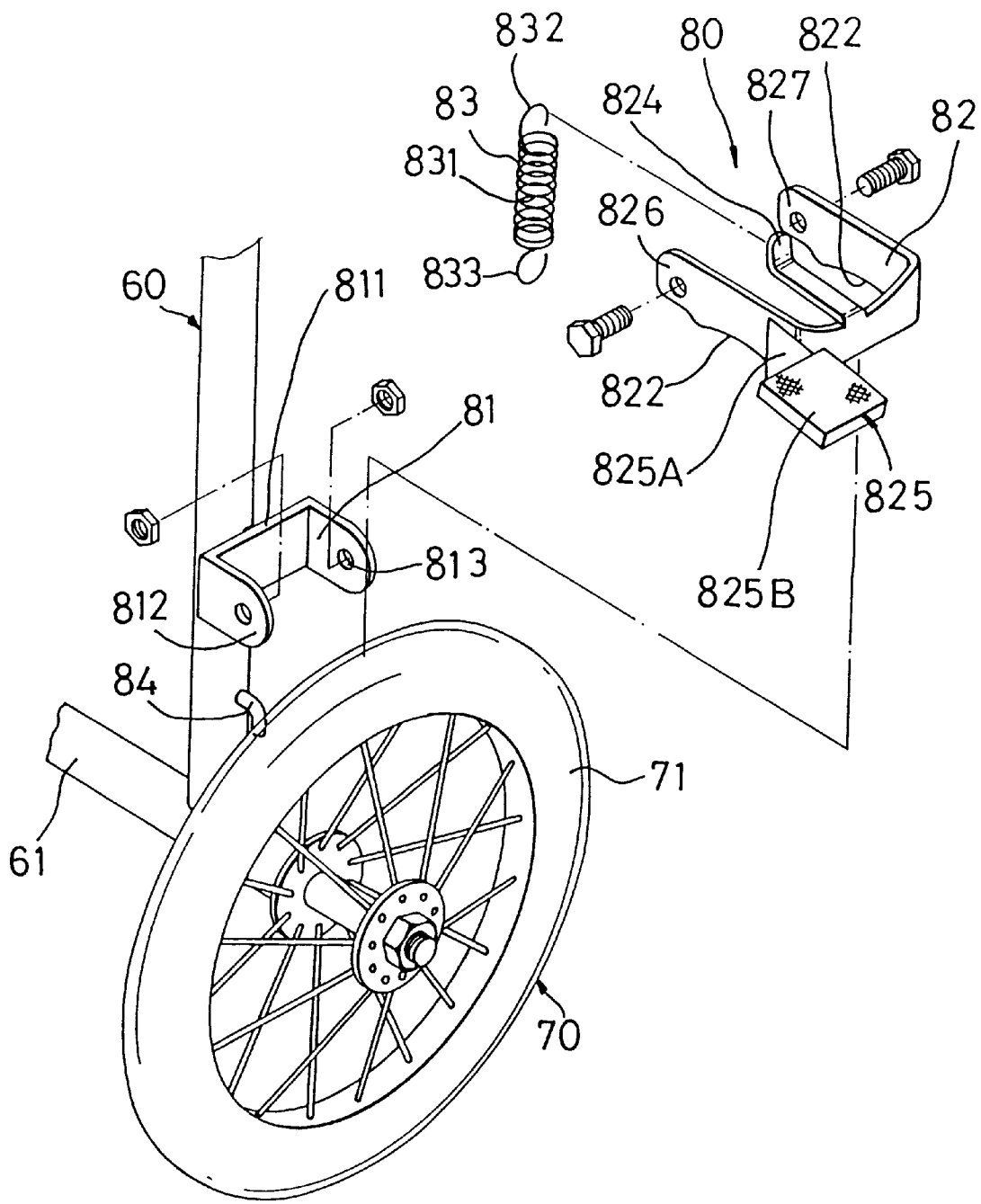
FIG. 2 is an exploded view of a preferred embodiment of a brake device of this invention shown together with a stroller frame.
Figure 3:
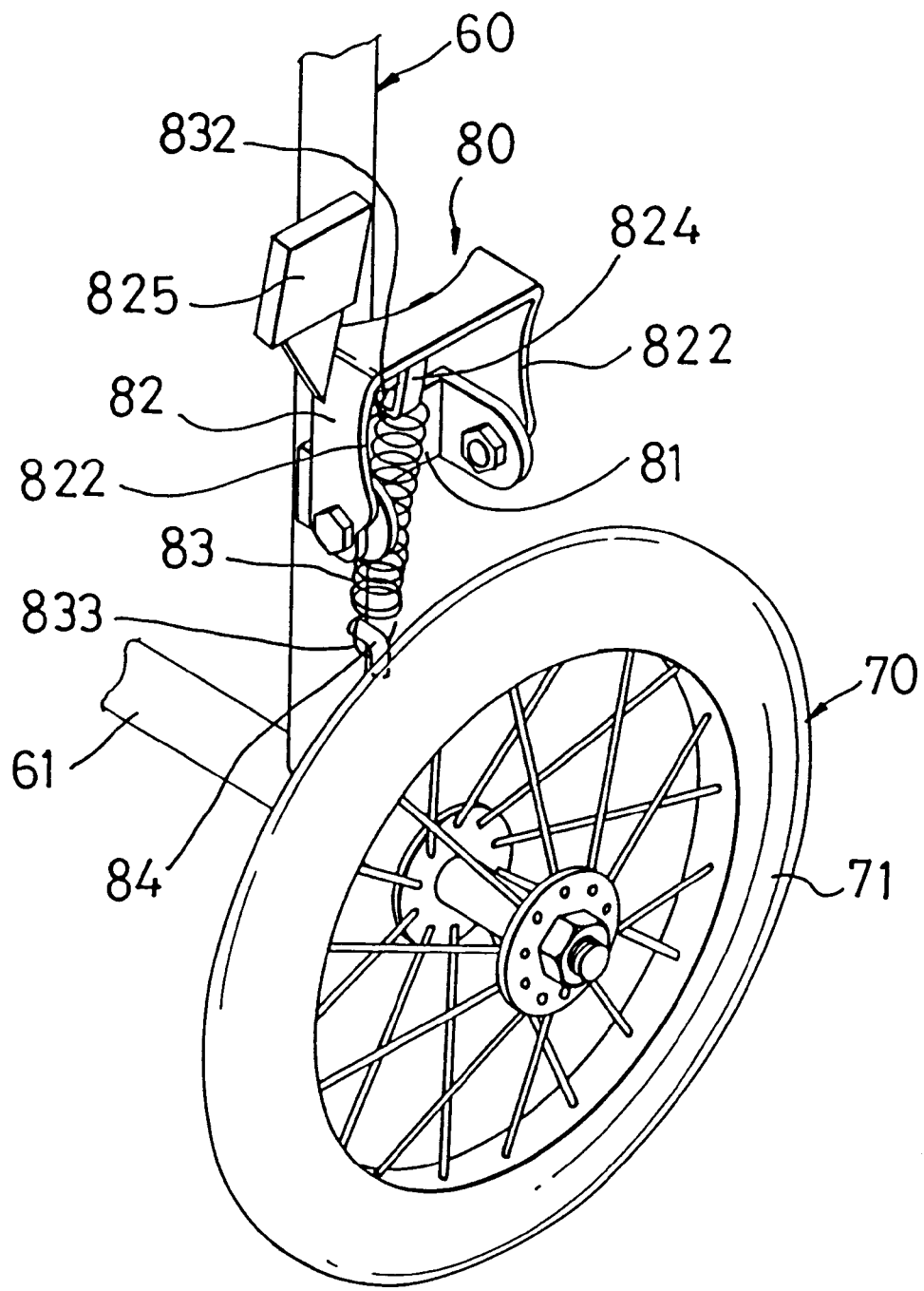
FIG. 3 illustrates the preferred embodiment of this invention when mounted on the stroller frame, wherein the preferred embodiment is shown at an unbraked position relative to a stroller wheel.
Figure 4:
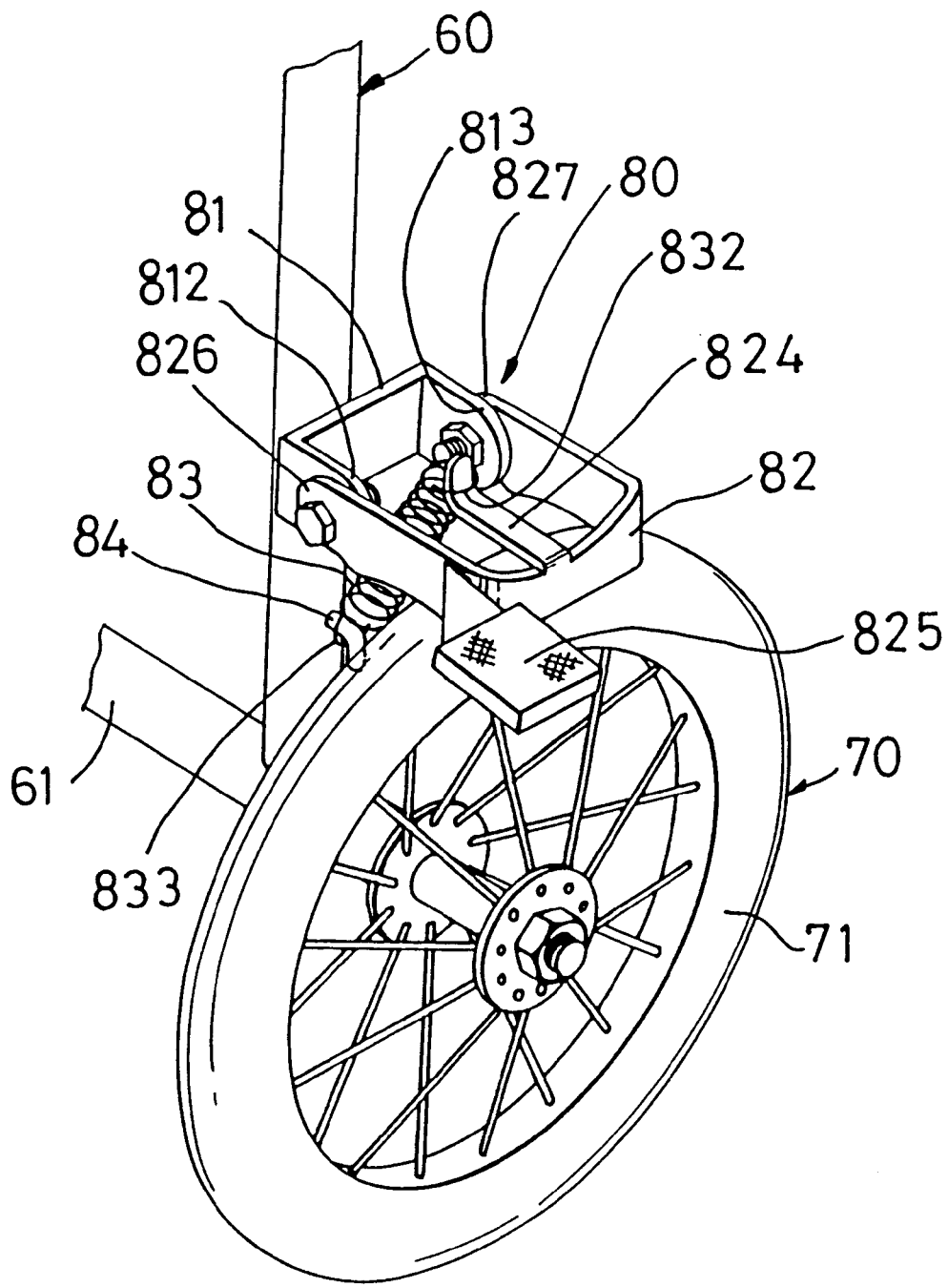
FIG. 4 illustrates the preferred embodiment of this invention when mounted on the stroller frame, wherein the preferred embodiment is shown at a braked position relative to the stroller wheel.

Referring to FIGS. 2, 3 and 4, the preferred embodiment of a brake device of this invention is used in a stroller which includes a rear axle 61 and a wheel member 70 with a tire 71. The wheel member 70 is rotatably mounted on the rear axle 61. The preferred embodiment includes a support post 60, a mounting frame 81, a brake shoe 80, and a biasing spring 83.

As illustrated, the support post 60 is fixedly secured relative to the rear axle 61 and is disposed inboard to the wheel member 70. The support post 60 extends uprightly from the rear axle 61 beyond an uppermost part of the tire 71. The mounting frame 81 includes a mounting portion 811 fixed on the support post 60 by welding means at a location above the tire 71. The mounting frame 81 further includes two lug portions 812, 813 that extend from the mounting portion 811 in a first direction transverse to the support post 60 and towards the tire 71. The lug portions 812, 813 are spaced apart from each other in a second direction transverse to the first direction.

The brake shoe 80 includes a pair of arresting portions 82 with two anchoring ends 826, 827 which are mounted pivotally on the lug portions 812, 813, respectively, by means of screws. The arresting portions 82 extend in the first direction are spaced apart from each other in the second direction, and define two arresting surfaces 822 therebeneath. The arresting portions 82 are adapted to arrest two spaced locations on the uppermost part of the tire 71. The arresting portions 82 are pivotable around a pivot axis (the screws) which extends parallel to the second direction between an arresting position, where the arresting portions 82 depress the uppermost part of the tire 71 at the spaced locations (see FIG. 4) after the arresting portions 82 turn clockwise around the pivot axis, and a retracted position, where the arresting portions 82 are lifted away from the spaced locations on the tire 71 (see FIG. 3).

The biasing spring 83 has a biasing action along a lengthwise axis 831, and two ends 832, 833 fixedly secured relative to the support post 60 and the brake shoe 80, respectively. The biasing spring 83 is disposed at a location between the arresting portions 82 such that when the arresting portions 82 are in the retracted position, the lengthwise axis 831 is at an angle of at least 90 degrees, and such that when the arresting portions 82 are in the arresting position, the lengthwise axis 831 is at an angle of less than 90 degrees, the angle of the lengthwise axis 831 being measured in a counterclockwise direction from the first direction.

In the preferred embodiment, the brake shoe 80 is in the form of a U-shaped frame, and further includes a foot pedal 825 which has a mounting end 825A fixed on one of the arresting portions 82, and a pedal body 825B extending away from the arresting portion 82 in the first direction for downward pressing or upward lifting of the foot pedal 825. The brake shoe 80 further has a hook portion 824 that is disposed between the arresting portions 82 above the arresting surfaces 822 that extends in the first direction toward the mounting frame 81 for hooking one end 832 of the biasing member 83 thereon such that the biasing member 83 will not be brought to contact with the wheel member 70 when the arresting portions 82 at the arresting position. The support post 60 is provided with a tongue 84 for hooking with the other end 833 of the biasing member 83.

Figure 5:
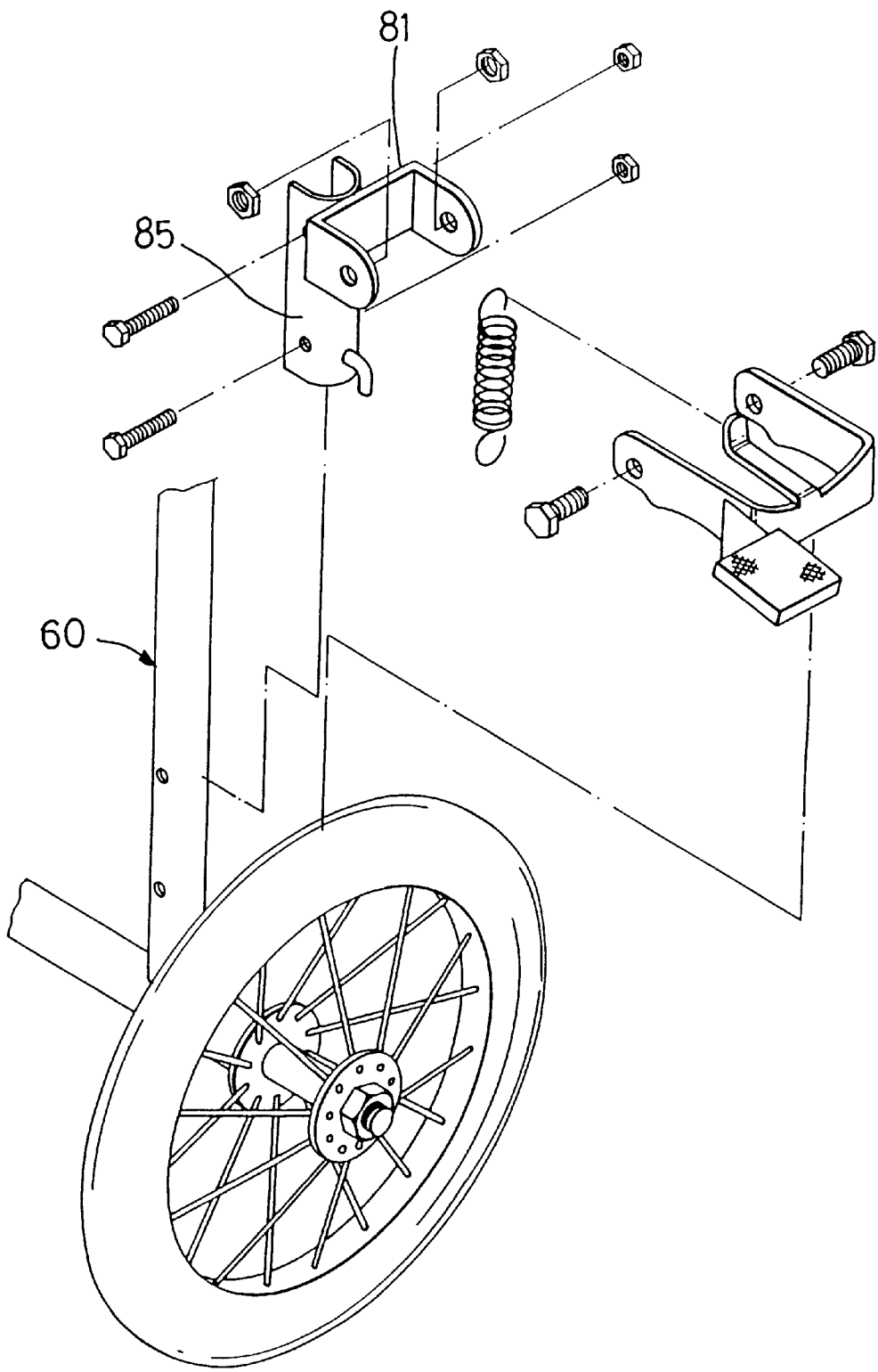
FIG. 5 is an exploded view of a modified preferred embodiment of a brake device of this invention shown together with a stroller frame.
Figure 6:
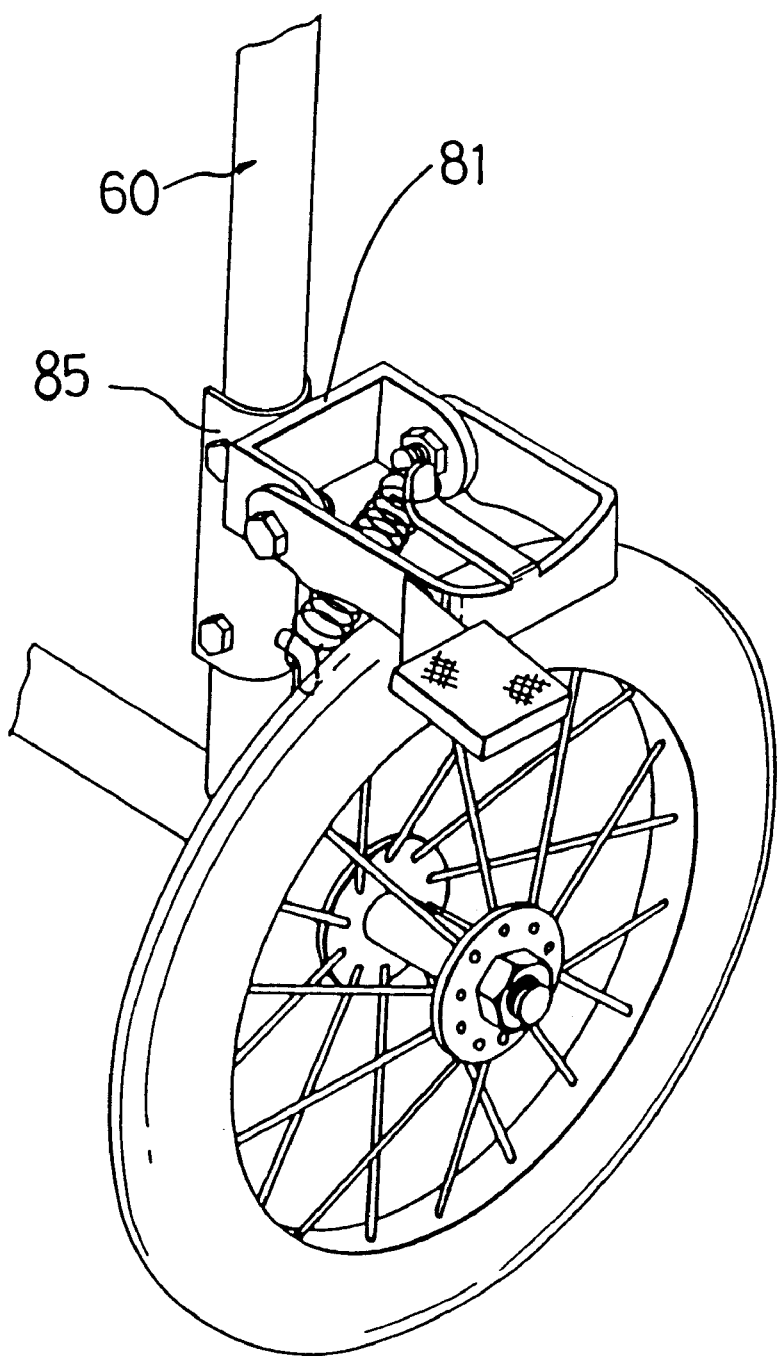
FIG. 6 illustrates the modified preferred embodiment of this invention when mounted on the stroller frame, wherein the modified preferred embodiment is shown at an unbraked position relative to a stroller wheel.

Referring to FIGS. 5 and 6, a modified preferred embodiment of this invention is shown to be similar to the previous embodiment in construction except that the mounting frame 81 thereof is provided with an uprightly extending mounting plate 85 that is integrally formed therewith and that conforms in shape with a corresponding portion of the support post 60 for close contact with the support post 60 to permit fixing of the mounting frame 81 on the support post 60. The operation is generally the same as that of the previous embodiment.

With this invention thus explained, it is apparent that numerous modifications and variations can be made without departing from the scope and spirit of this invention. It is therefore intended that this invention be limited only as indicated in the appended claims.

I claim:

1. A brake device for a stroller which includes a wheel member with a tire, and a rear axle having the wheel rotatably mounted thereon, the brake device comprising:

a support post adapted to be disposed inboard to the wheel member, and adapted to be fixedly secured relative to and extending uprightly from the rear axle beyond an uppermost part of the tire;

a mounting frame disposed on said support post and adapted to be located beyond the uppermost part of the tire, said mounting frame including two lug portions respectively extending in a first direction transverse to said support post and towards the tire and spaced apart from each other in a second direction transverse to said first direction;

a brake shoe including a pair of arresting portions with two anchoring ends which are mounted pivotally on said lug portions respectively, said arresting portions extending in said first direction and being spaced apart from each other in said second direction so as and forming two arresting surfaces therebeneath, said arresting surfaces being adapted to arrest two spaced locations on the uppermost part of the tire, said arresting portions being pivotable around a pivot axis which is parallel to said second direction between a retracted position, where said arresting portions are lifted away from the spaced locations on the tire, and an arresting position, where said arresting portions depress said uppermost part of the tire at the spaced locations; and a biasing spring having a biasing action along a lengthwise axis, and two ends fixedly secured relative to said support post and to said brake shoe, respectively, said biasing spring being disposed between said arresting portions such that when said arresting portions are in said retracted position, said lengthwise axis is at an angle of at least 90 degrees measured in a counterclockwise direction from said first direction and such that when said arresting portions are in said arresting position, said lengthwise axis is at an angle of less than 90 degrees measured in the counterclockwise direction from said first direction.

2. The brake device as defined in claim 1, wherein said brake shoe further includes a foot pedal having a mounting end fixed on one of said arresting portions and a pedal body extending away from said one of said arresting portions in said first direction for downward pressing or upward lifting of said foot pedal, and a hook portion disposed between said arresting portions above said arresting surfaces and extending in said first direction toward said mounting frame for hooking one of said two ends of the biasing member thereon such that said biasing member will not be brought into contact with the wheel member when said arresting portions are at said arresting position.

3. The brake device as defined in claim 2, wherein said support post is provided with a tongue inboard to the wheel member for hooking with the other one of said two ends of said biasing member.

4. The brake device as defined in claim 3, wherein said mounting frame is provided with an uprightly extending mounting plate integrally formed therewith and confining in shape with a corresponding portion of said support post for close contact with said support post to permit fixing of said mounting frame on said support post.

* * * * *